(12) United States Patent
Takeda et al.

(10) Patent No.: US 8,746,991 B2
(45) Date of Patent: Jun. 10, 2014

(54) REPAIRING METHOD, REPAIRING STRUCTURE AND CONNECTING STRUCTURE OF EMBEDDED OPTICAL FIBER OF COMPOSITE MATERIAL STRUCTURE

(75) Inventors: Nobuo Takeda, Tokyo (JP); Shu Minakuchi, Tokyo (JP); Tadahito Mizutani, Tokyo (JP); Junichi Kimoto, Inuyama (JP); Noriyoshi Hirano, Kakamigahara (JP); Hiroaki Tsutsui, Kakamigahara (JP)

(73) Assignees: The University of Tokyo, Tokyo (JP); Kawasaki Jukogyo Kabushiki Kaisha, Tokyo (JP)

( * ) Notice: Subject to any disclaimer, the term of this patent is extended or adjusted under 35 U.S.C. 154(b) by 28 days.

(21) Appl. No.: 13/486,649

(22) Filed: Jun. 1, 2012

(65) Prior Publication Data

US 2013/0094820 A1    Apr. 18, 2013

(30) Foreign Application Priority Data

Jun. 8, 2011   (JP) .................................. 2011-127984

(51) Int. Cl.
*G02B 6/255* (2006.01)
(52) U.S. Cl.
USPC .................... 385/98; 385/95; 385/97; 385/99
(58) Field of Classification Search
USPC ........................................ 385/95, 97, 98, 99
See application file for complete search history.

(56) References Cited

U.S. PATENT DOCUMENTS

| | | | |
|---|---|---|---|
| 7,016,573 B2 * | 3/2006 | Dong et al. ..................... | 385/46 |
| 2007/0122098 A1 | 5/2007 | Menendez Martin | |
| 2010/0140217 A1 * | 6/2010 | Weisser .......................... | 216/33 |

FOREIGN PATENT DOCUMENTS

| | | |
|---|---|---|
| DE | 10 2007 030 025 B3 | 10/2008 |
| DE | 10 2010 039 153 A1 | 2/2012 |
| GB | 2 448 537 A | 10/2008 |
| JP | A-2005-321223 | 11/2005 |
| JP | A-2009-517680 | 4/2009 |
| WO | WO 01/51974 A2 | 7/2001 |
| WO | WO 01/51976 A1 | 7/2001 |

OTHER PUBLICATIONS

Friebele et al., "Optical fiber sensors for spacecraft applications," *Smart Materials and Structures*, 1999, vol. 8, pp. 813-838.
Extended Search Report issued in European Patent Application No. 12004367.4 dated Jan. 22, 2013.

* cited by examiner

*Primary Examiner* — Ryan Lepisto
(74) *Attorney, Agent, or Firm* — Oliff PLC

(57) ABSTRACT

A method of repairing an embedded optical fiber of a composite material structure including an embedded optical fiber embedded in a composite material, includes removing a portion of the composite material including a damaged portion of the embedded optical fiber to form an opening portion; polishing an end surface of the embedded optical fiber exposed in the opening portion and an end surface of the composite material exposed in the opening portion; and performing position adjustment such that a core of the polished embedded optical fiber and a core of a replacement optical fiber are aligned with each other, butting the end surface of the embedded optical fiber and an end surface of the replacement optical fiber with each other, and connecting the end surface of the embedded optical fiber and the end surface of the replacement optical fiber together.

9 Claims, 13 Drawing Sheets

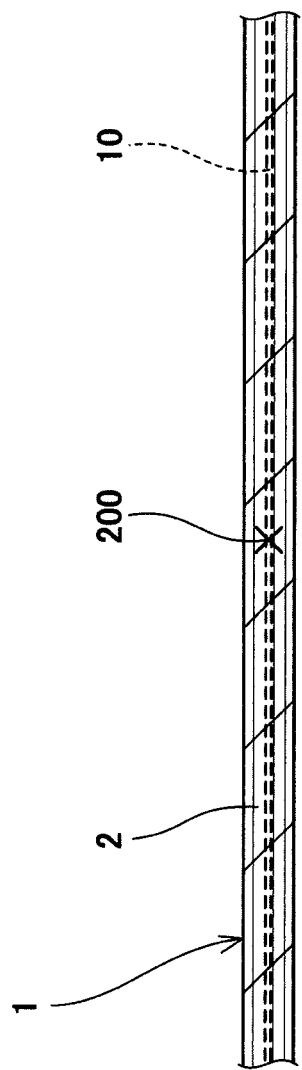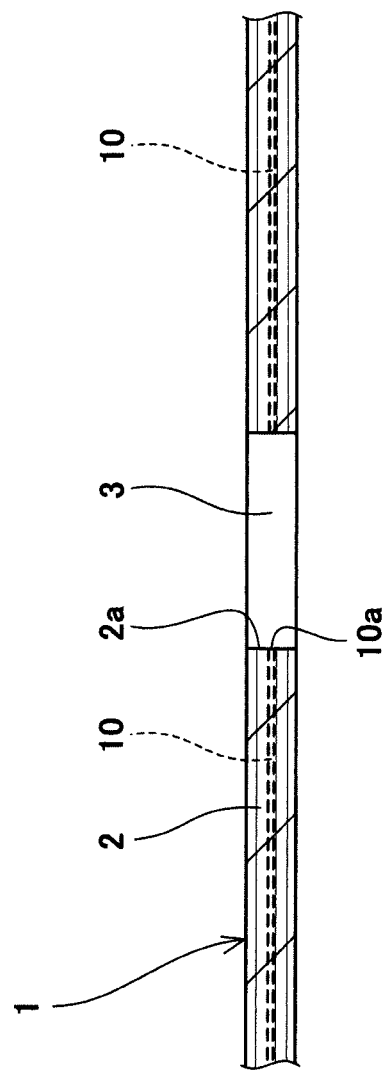

| CONNECTING STRUCTURE | LIGHT SOURCE LIGHT INTENSITY(mW) | LIGHT INTENSITY AFTER CONNECTION(mW) | LIGHT LOSS(dB) |
|---|---|---|---|
| END SURFACE ANGLE 90° | 0.73 | 0.15 | 6.8 |
| END SURFACE ANGLE 45° | 0.73 | 0.11 | 8.1 |

Fig.13

REPAIRING METHOD, REPAIRING STRUCTURE AND CONNECTING STRUCTURE OF EMBEDDED OPTICAL FIBER OF COMPOSITE MATERIAL STRUCTURE

BACKGROUND OF THE INVENTION

1. Field of the Invention

The present invention relates to a method of repairing a damaged portion of an optical fiber embedded in a structure made of a composite material, a repairing structure of the embedded optical fiber and a connecting structure of the embedded optical fiber.

2. Description of the Related Art

In recent years, composite material structures have been used in various fields. Since composite materials are smaller in weight and higher in strength and stiffness than metal materials, structures incorporating the composite materials can be reduced in weight. Therefore, for example, the use of the composite materials in structures of aircraft and the like has been expanding.

There may be a chance that an internal damage is generated in the composite material structure due to, for example, a collision of foreign objects against the composite material structure, or the like. Therefore, it becomes necessary to perform a design (dame tolerance design) which allows a damage which is unable to be found out in an inspection or a design (fail safe design) which prevents a damage from becoming fatal before a next inspection is conducted. A damage which is not allowable in design must be found out in inspection and repaired. Therefore, a visual inspection or a non-destructive inspection must be conducted from an inner surface side of fuselage as well as an outer surface of the fuselage. For some composite material structures having a complex shape or a complex curved surface, non-destructive inspection cannot be conducted. Accordingly, as a method of inspecting and diagnosing structural health, for example, the presence/absence of the damage in the composite material structure, for contributing to reduction of structure weight generated in the damage tolerance design and the fail safe design, reduction of cost/reduction of period/prevention of error/easiness of the visual inspection or the non-destructive inspection, there is proposed a damage detection system for detecting the damage or the like by using an optical fiber sensor embedded in the composite material.

As this type of prior art, for example, there is a dame detection device (in the embodiment, including a damage detection device which performs comparison of FBG (Fiber Bragg Grating) sensor measurement values of strains occurred by impact applied to the composite material and analysis values and uses a difference of strain response arrival time), in which a plurality of sensors (strain measurement FBG sensors, etc.) for reflecting optical signals with different frequencies are provided to be spaced apart from each other, in an optical path structure constructed using an optical fiber, such as a composite material structure embedded with the optical fiber, and the presence/absence, level or location of the damage are determined based on the presence/absence and intensities of the optical signals reflected in the sensors (optical intensity measurement), etc. (e.g., see Patent Literature 1: Japanese Laid-Open Patent Application Publication No. 2005-321223).

In the case of using the damage detection method as described above, if a damage occurs in the optical fiber embedded in the composite material, the damaged portion must be repaired. For example, as a repair method of an optical fiber as a single member, there is a method in which the damaged portion is cut, a replacement optical fiber is placed in a portion where the damaged portion is cut, and the replacement optical fiber is connected to the optical fiber by fusion splicing or in a state in which the end surface of the optical fiber and the end surface of the replacement optical fiber are butted with each other. However, the above repair method is unable to repair the optical fiber embedded in composite material structures.

Accordingly, as a repair method in the case where a damage occurs in the optical fiber embedded in the composite material, there is a method shown in FIGS. 14A to 14C. This method is as follows. If a damage 200 occurs in an embedded optical fiber 110 embedded in a composite material 102 of a composite material structure 101 (FIG. 14A), a replacement optical fiber 120 is bonded to the surface of a damaged portion of the composite material 102 by adhesive 121 (FIGS. 14B, 14C), to connect the replacement optical fiber 120 to the embedded optical fiber 110 in a position apart from the damaged position.

As a repairing method in the case where a damage occurs in the optical fiber embedded in the composite material structure, there is a method in which the surface layer of the composite material is scraped out and removed, and the end portion of another optical fiber is joined to the end portion of the optical fiber, which corresponds to the removed portion of the composite material, by fusion-splicing etc. (see e.g., Patent Literature 2: Translated PCT Application Publication No. 2009-517680).

However, in the repairing method shown in FIG. 14, the embedded optical fiber itself is not repaired, and other healthy portion which cannot attain necessary transmitted light due to the damaged portion, as well as the damaged portion, cannot be used and is left. The optical fiber for use as the above stated optical fiber sensor has a core diameter of about 5 µm to 10 µm, and a cladding diameter of about 40 µm to 130 µm, for example. In the configuration in which the replacement optical fiber is bonded to the surface of the composite material and the end portion of the replacement optical fiber is connected to the optical fiber embedded in the composite material, problems associated with durability and reliability of the optical fiber bonded to the surface may sometimes arise. Especially, in the case of a smaller diameter optical fiber, a severe problem associated with durability and reliability might arise. Furthermore, in a certain composite material structure, the optical fiber cannot be placed in the surface. In that case, the above stated method cannot be applied.

In addition, as compared to the case where an optical fiber is embedded, in some cases, it becomes difficult to detect a damage accurately based on the presence/absence, intensity, or the like of an optical signal reflected by the optical fiber sensor.

In the repairing method disclosed in Patent Literature 2, the above stated embedded optical fiber having the damaged portion might be further damaged when the corresponding portion of the composite material is scraped out and removed from the surface layer. Thus, it is difficult to draw out the embedded optical fiber in a healthy state. Because of this, it is difficult to repair the optical fiber sensor to a state in which it is capable of detecting a damage and others accurately again or to repair the optical fiber to a state in which it is capable of attaining necessary transmitted light again.

SUMMARY OF THE INVENTION

Accordingly, an object of the present invention is to provide an embedded optical fiber repairing method, a repairing structure, and a connecting structure of a composite material structure, which can repair an entire embedded optical fiber by replacing a damaged portion of the embedded optical fiber by a replacement optical fiber when the embedded optical fiber embedded in a composite material is damaged.

To achieve the above object, according to the present invention, there is provided a method of repairing an embedded optical fiber of a composite material structure including an embedded optical fiber embedded in a composite material, comprising: removing a portion of the composite material including a damaged portion of the embedded optical fiber to form an opening portion; polishing an end surface of the embedded optical fiber exposed in the opening portion and an end surface of the composite material exposed in the opening portion; and performing position adjustment such that a core of the polished embedded optical fiber and a core of a replacement optical fiber are aligned with each other, butting the end surface of the embedded optical fiber and an end surface of the replacement optical fiber with each other, and connecting the end surface of the embedded optical fiber and the end surface of the replacement optical fiber together. In specification and claims, the term "embedded optical fiber" is defined as an optical fiber embedded in the composite material, and the term "replacement optical fiber" is defined as an optical fiber placed in the damaged portion to replace the portion of the embedded optical fiber removed from the composite material. In accordance with this configuration, even when the embedded optical fiber embedded in the composite material is damaged, the embedded optical fiber can be repaired in such a manner that the damaged portion of the embedded optical fiber is removed together with the composite material, and then is replaced by the replacement optical fiber within a range of a plate thickness.

The replacement optical fiber may have an optical fiber array at an end portion thereof, and an end surface of the optical fiber array and the end surface of the embedded optical fiber may be connected together by bonding. In accordance with this configuration, the position of the embedded optical fiber after polishing is detected, and the optical fiber array of the replacement optical fiber can be bonded to the polished embedded optical fiber by means of adhesive. Thus, the optical fiber array and the embedded optical fiber can be joined together easily.

The method may comprise, after polishing the end surface of the embedded optical fiber and the end surface of the composite material, emitting a light from a light source into the embedded optical fiber, the light source being provided at an end portion of the embedded optical fiber which is at an opposite side of the damaged portion; detecting the light of the light source at the end surface of the embedded optical fiber exposed in the opening portion; and determining that a position at which an intensity of the light is highest is a position of the core of the embedded optical fiber, aligning the core of the replacement optical fiber with the core of the embedded optical fiber, and connecting the end surface of the embedded optical fiber and the end surface of the replacement optical fiber together. In accordance with this configuration, since the intensity of the light is detected at the damaged portion of the embedded optical fiber, the position of the core of the embedded optical fiber can be detected accurately and quickly. This makes it possible to quickly align the core of the replacement optical fiber with the core of the embedded optical fiber.

The embedded optical fiber may include a light reflection device, and the method comprise after polishing the end surface of the embedded optical fiber and the end surface of the composite material, applying an incident light through the polished end surface of the embedded optical fiber; and detecting the light reflected by the light reflection device, determining that a position at which an intensity of the light is highest is a position of the core of the embedded optical fiber, aligning the core of the replacement optical fiber with the core of the embedded optical fiber, and connecting the end surface of the embedded optical fiber and the end surface of the replacement optical fiber together. In accordance with this configuration, the embedded optical fiber including the light reflection device such as an FBG sensor, is capable of quickly detecting the core position of the embedded optical fiber by utilizing the light reflected by the light reflection device, which makes it possible to quickly align the core of the replacement optical fiber with the core of the embedded optical fiber.

The method may comprise holding the replacement optical fiber connected to the embedded optical fiber on the composite material structure by one of surfaces of the composite material structure and closing the opening portion by the other surface of the composite material structure. In accordance with this configuration, it becomes possible to repair the embedded optical fiber while suppressing reduction of a strength of the composite material structure which would be caused by removing the portion of the composite material including the damaged portion of the embedded optical fiber.

The method may comprise bonding and stacking composite material thin plates together in the opening portion, and embedding the replacement optical fiber connected to the embedded optical fiber between the composite material thin plates to close the opening portion. The "composite material thin plates" include both of cured hard plates and uncured soft plates (prepreg). In accordance with this configuration, since the opening portion formed by removing the damaged portion of the embedded optical fiber together with the portion of the composite material is filled with the stacked composite material thin plates, reduction of a strength of the composite material structure can be suppressed. In this case, by forming the opening portion with a conical shape, a good bonding strength is attained between the stacked composite material thin plates and the composite material structure in the vicinity thereof. As a result, highly reliable repair is realized.

According to the present invention, there is provided a repairing structure of an embedded optical fiber of a composite material structure, which is repaired by any of the above stated embedded optical fiber repairing methods, in which the replacement optical fiber connected to the end surface of the damaged portion of the embedded optical fiber is held by a replacement optical fiber holding member provided on one of surfaces of the composite material structure, and a reinforcement member for closing the opening portion is provided on the other surface of the composite material structure provided with the replacement optical fiber holding member. The reinforcement member may be a composite material or metal such as titanium alloy. This reinforcement member is attached by means of boding or fastening using a fastener member such as bolts. In accordance with this configuration, after the damaged portion of the embedded optical fiber embedded in the composite material structure is replaced by the replacement optical fiber within a range of the plate thickness, the replacement optical fiber can be held in the repaired portion, and reduction of a strength of the composite material structure corresponding to the repaired portion, can be suppressed. Thus, repair is performed to attain the highly reliable optical fiber.

According to the present invention, there is provided a connecting structure of an embedded optical fiber for connecting an optical fiber array to an embedded optical fiber embedded in a composite material structure, wherein the embedded optical fiber has a polished surface in a portion corresponding to an end surface of the composite material structure; and the optical fiber array is connected to the end surface of the embedded optical fiber by bonding in a state in which position adjustment is performed in such a manner that a core of the embedded optical fiber and a core of an optical fiber provided with the optical fiber array are aligned with each other at the polished surface of the embedded optical surface. In accordance with this configuration, even when a peripheral portion of the composite material structure embedded with the embedded optical fiber is cut, the optical fiber array is connected to the embedded optical fiber corresponding to the cut surface to form a continuous optical fiber, which can be performed easily.

The above and further objects, and features of the invention will more fully be apparent from the following detailed description with reference to the accompanying drawings.

BRIEF DESCRIPTION OF THE DRAWINGS

FIG. 1A is a cross-sectional view of a composite material structure before repair, which is repaired by an embedded optical fiber repairing method of the composite material structure according to Embodiment 1 of the present invention.

FIG. 1B is a cross-sectional view of the composite material structure at starting of repair, which is repaired by the embedded optical fiber repairing method of FIG. 1.

FIG. 13 is a table list showing a result of measurement of light intensity in an example.

DETAILED DESCRIPTION OF THE PREFERRED EMBODIMENTS

Figure 2:
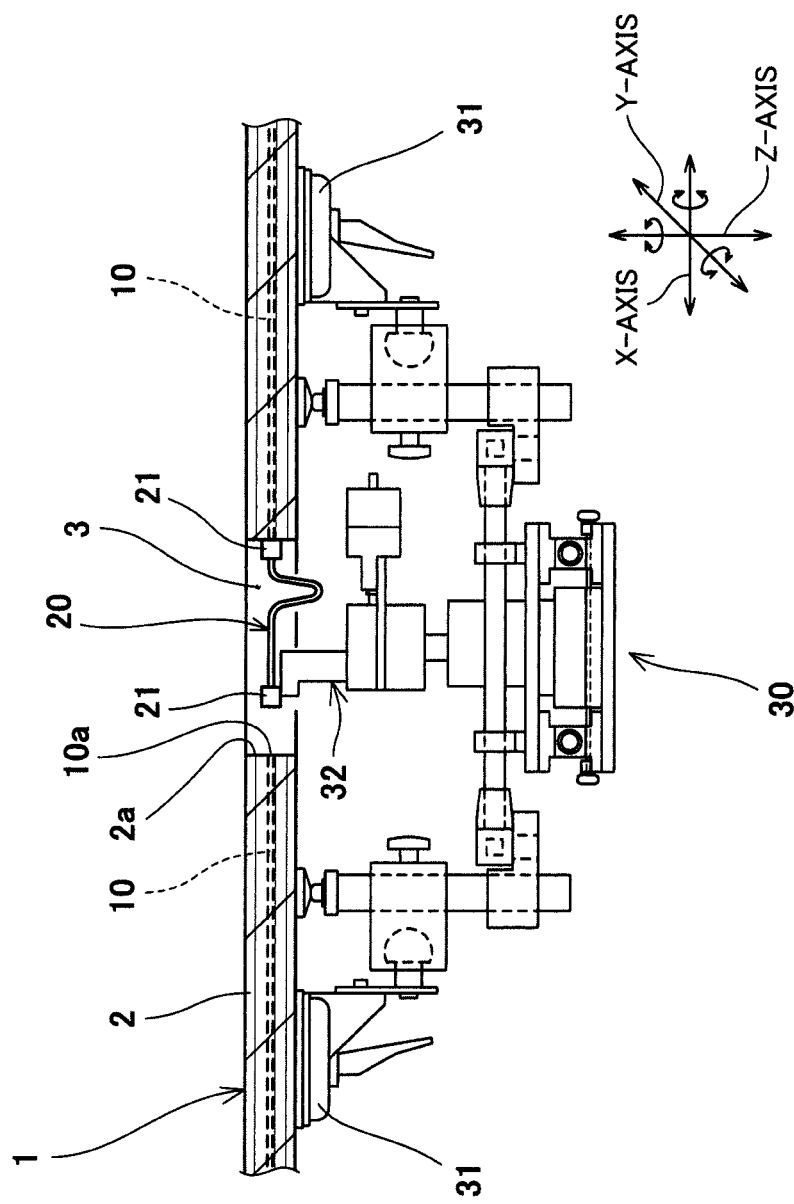
FIG. 2 is a cross-sectional view showing a state in which a replacement optical fiber is connected to the composite material structure repaired by the embedded optical fiber repairing method of FIG. 1.

Hereinafter, embodiments of the present invention will be described with reference to the drawings. In the embodiments described below, for example, aircraft (fuselage, wings, rudder, etc.) will be described as a specific example of a structure incorporating a composite material structure. Hereinafter, as a composite material 2 forming a composite material structure 1, for example, a material in which prepreg sheets made of a matrix of polymer resin such as epoxy resin are stacked together in a plate thickness direction and cured, is used. The prepreg (abbreviation of pre-impregnated materials) sheets are an intermediate base material for molding in which the matrix resin is pre-impregnated with a fiber-reinforced base material. Hereinafter, as an example of an embedded optical fiber 10 and a replacement optical fiber 20, a description will be given of an example in which an optical fiber having a smaller diameter is used in view of embedding into the composite material structure 1, as will be described later.

It is supposed that a damage is generated in the embedded optical fiber 10 embedded in the composite material structure 1, along with damage to the composite material structure 1. It is also supposed that the presence/absence and position of the damage are measured by the above stated transmitted light intensity measurement or FBG sensor strain measurement, and identified accurately by non-destructive inspection or the like.

Initially, a description will be given of an overall procedure of a repairing method in a case where a damage 200 is generated in the embedded optical fiber 10 embedded in the composite material structure 1, with reference to FIGS. 1 to 3.

As shown in FIG. 1A, when the damage 200 is generated in the embedded optical fiber 10 embedded in the composite material structure 1 made of the composite material 2, a portion of the composite material 2 including a damaged portion is removed together as shown in FIG. 1B. The portion of the composite material 2 is removed by forming a circular opening portion (through-hole) 3 having a diameter of about 30 mm. Then, an end surface 10a of the embedded optical fiber 10 which is exposed in the opening portion 3 is polished together with an end surface 2a of the composite material 2.

Then, as shown in FIG. 2, an embedded optical fiber repairing device 30 detects the position of the polished end surface 10a of the embedded optical fiber 10, and the end surface of the replacement optical fiber 20 is moved to and butted with the polished end surface 10a of the embedded optical fiber 10, and they are bonded and joined together by adhesive. The embedded optical fiber repairing device 30 of FIG. 2 is capable of detecting the position of the polished end surface 10a of the embedded optical fiber 10, moving the replacement optical fiber 20 to that position, and butting the end surface of the replacement optical fiber 20 with the end surface 10a of the embedded optical fiber 10, which occurs automatically. The detail will be described later.

Figure 4:
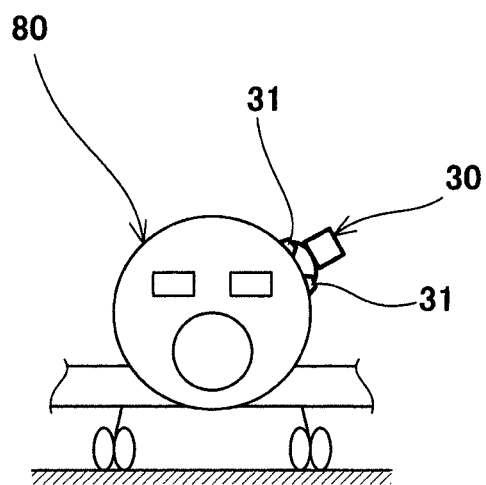
FIG. 4 is a schematic view in a case where aircraft is repaired by the optical fiber repairing method of the composite material structure FIG. 1.

The embedded optical fiber repairing device 30 of the present embodiment is provided with a vacuum chuck 31 suctioned to the outer surface of the composite material structure 1. For example, as shown in FIG. 4, the vacuum chuck 31 is suctioned and fastened to the outer surface of an aircraft 80. Although in the present embodiment, the embedded optical fiber repairing device 30 is suctioned to and supported on the outer surface of the aircraft 80 by using the vacuum chuck, the embedded optical fiber repairing device 30 may be installed on a foothold assembled on a floor surface. If the aircraft 80 is shaking, it becomes relatively easy to perform automatic alignment of the core of the replacement optical fiber 20, by suctioning the embedded optical fiber repairing device 30 onto the outer surface of the aircraft 80 and supporting it thereon, because the embedded optical fiber repairing device 30 is shaking as well. The embedded optical fiber repairing device 30 may be supported by a method adapted to an object to be repaired, a repair position, etc. The method is not limited to the present embodiment.

As shown in FIG. 2, the embedded optical fiber repairing device 30 includes an optical fiber moving section 32 at an upper portion thereof. The replacement optical fiber 20 in this example is provided with an optical fiber array (connecting device for joining an optical waveguide element to optical fiber) 21 at an end portion thereof. Therefore, the optical fiber moving section 32 is an optical fiber array moving section 32 (assigned with the same reference symbol as the optical fiber moving section) for performing position adjustment such that the optical fiber array 21 and the embedded optical fiber 10 are connected together. The optical fiber array moving section 32 has an automatic core alignment function for adjusting the position of the optical fiber array 21 held with 6 degrees of freedom (six axes). The 6 degrees of freedom means that the optical fiber array 21 is capable of being displaced along X-axis, Y-axis and Z-axis and being rotated around X-axis, Y-axis and Z-axis as indicated by arrows of FIG. 2.

As described above, the optical fiber array moving section 32 is capable of automatically aligning the optical fiber array 21 which is the end portion of the replacement optical fiber 20, with the position of the embedded optical fiber 10, within the opening portion 3, with 6 degrees of freedom. The optical fiber array moving section (optical fiber moving section) 32 preferably has 5 to 6 degrees of freedom, or may have degrees of freedom which are less than 5 to 6 degrees.

Figure 3:
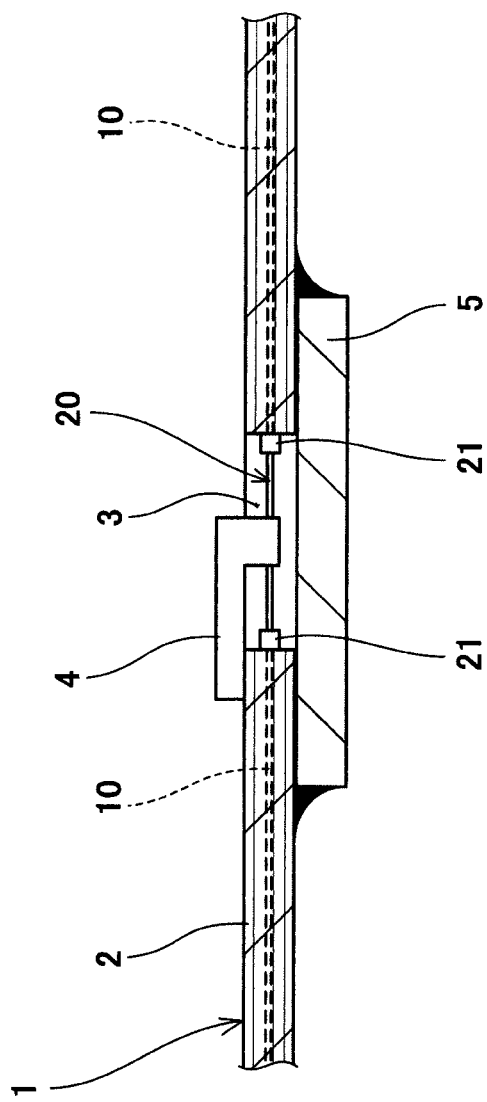
FIG. 3 is a cross-sectional view of a composite material structure portion to which the replacement optical fiber is joined by the embedded optical fiber repairing method of FIG. 1.

Then, as shown in FIG. 3, the replacement optical fiber 20 with the optical fiber arrays 21 at both ends connected to the embedded optical fiber 10 is held by a replacement optical fiber holding member 4 provided on an inner surface side of the composite material structure 1. A reinforcement member 5 is bonded to or fastened by a fastener member to the outer surface of the repaired portion of the composite material structure 1 such that the reinforcement member 5 closes the opening portion 3 from the outer surface. The reinforcement member 5 supports a load applied to the repaired portion and renders a strength of the composite material structure 1 in a portion corresponding to the opening portion 3 equal to or higher than that before repair. The reinforcement member 5 may be a composite material 2 or metal such as titanium alloy. This makes it possible to replace the damaged embedded optical fiber 10 with the replacement optical fiber 20 within a range of its plate thickness, and repair the optical fiber embedded in the composite material structure 1.

Figure 5:
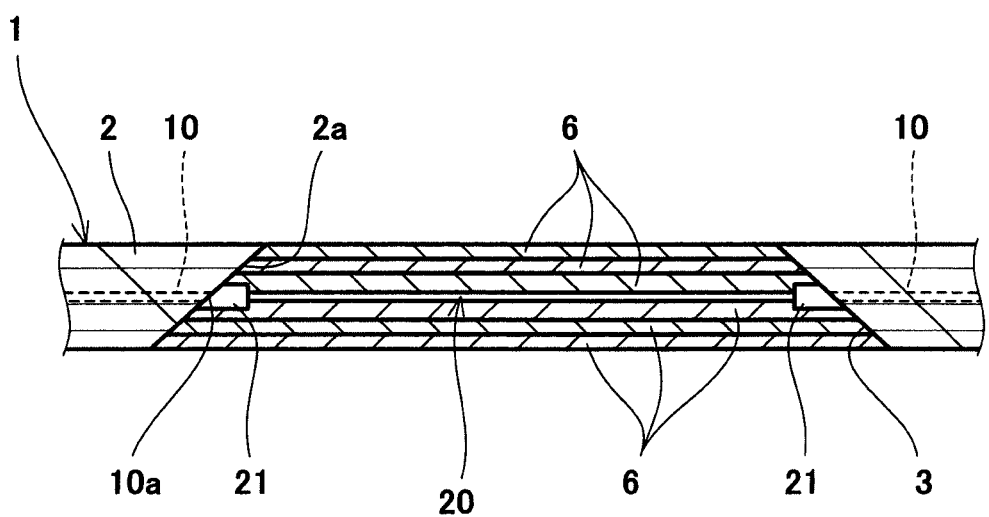
FIG. 5 is an enlarged cross-sectional view showing another example of the composite material structure portion of FIG. 3 to which the replacement optical fiber is joined.

As shown in FIG. 5, the opening portion 3 may have a conical shape, and may be closed in such a manner that composite material thin plates 6 are stacked together and filled therein, and the replacement optical fiber 20 joined to the embedded optical fiber 10 is embedded therein. The composite material thin plates 6 may be desired plates which are cured hard plates or uncured soft plates. In this case, the composite material thin plates 6 may be stacked from a direction of one surface of the composite material structure at an opposite side where the embedded optical fiber repairing device 30 is disposed, and when they reach the position of the embedded optical fiber 10, the replacement optical fiber 20 is connected to the position of the embedded optical fiber 10, and then the composite material thin plates 6 may be stacked up to the other surface of the composite material structure.

In the above described configuration, since the opening portion 3 having the conical shape is filled with the stacked composite material thin plates 6, a good bonding strength is attained between the stacked composite material thin plates 6 and the composite material structure 1 in the vicinity thereof, which can achieve repair with high reliability. Note that the shape of the opening portion 3 filled with the composite material thin plates 6 is not limited to the conical shape.

Then, with reference to FIGS. 6 and 7, the flow of the repair of the embedded optical fiber 10 by the embedded optical fiber repairing device 30 of FIG. 2 will be described more specifically. Hereinafter, a description will be given of a work which occurs such that after a damaged portion is generated in the embedded optical fiber 10, along with damage to the composite material structure 1 and the damaged position is identified accurately by a non-destructive inspection or the like, a portion of the composite material 2 including the damaged portion of the embedded optical fiber 10 is cut, the exposed surface of the embedded optical fiber 10, which corresponds to the cut portion, is polished, and then the optical fiber array 21 provided at the end portion of the replacement optical fiber 20 is connected to the end surface 10a of the embedded optical fiber 10 left in the composite material 2.

Figure 6:
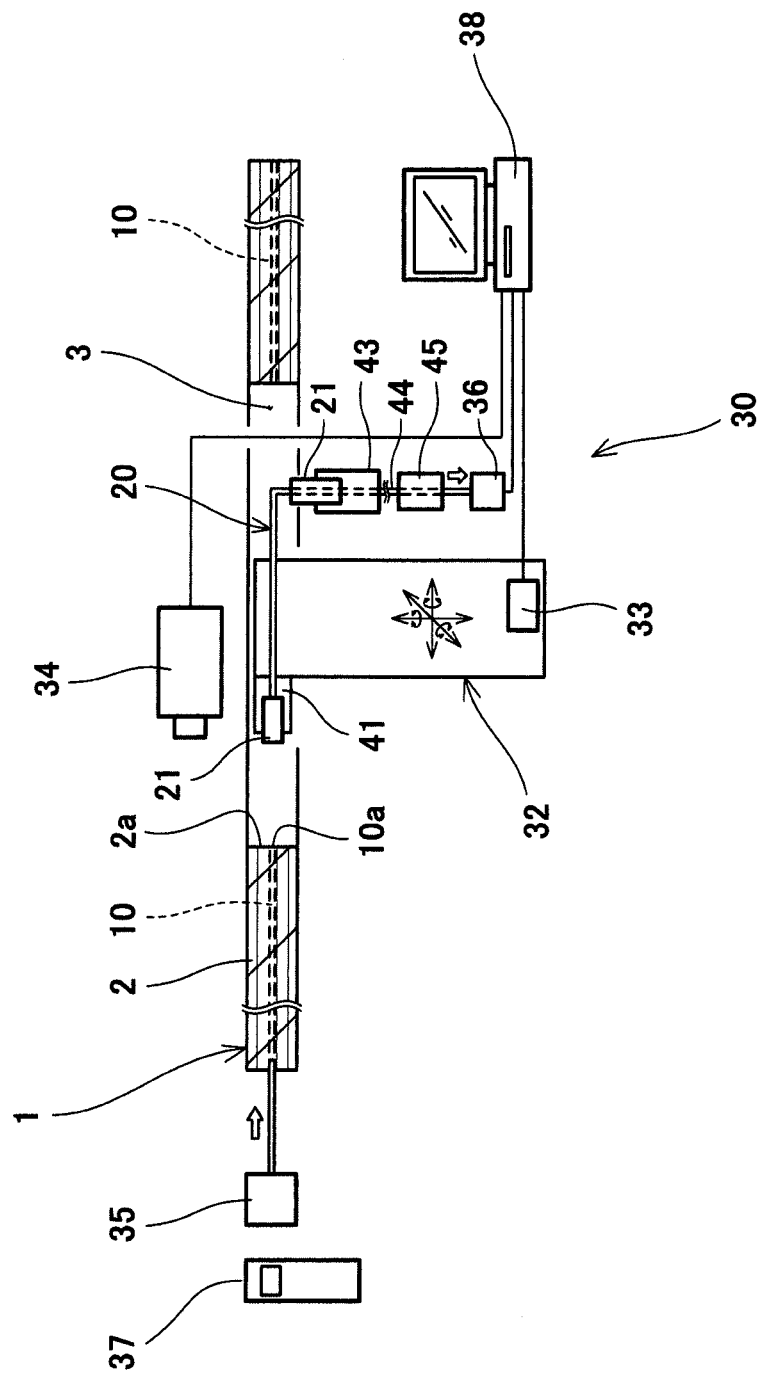
FIG. 6 is a cross-sectional view showing an optical fiber array holding section of an embedded optical fiber repairing device and a repaired portion of the composite material structure of FIG. 2.
Figure 7:
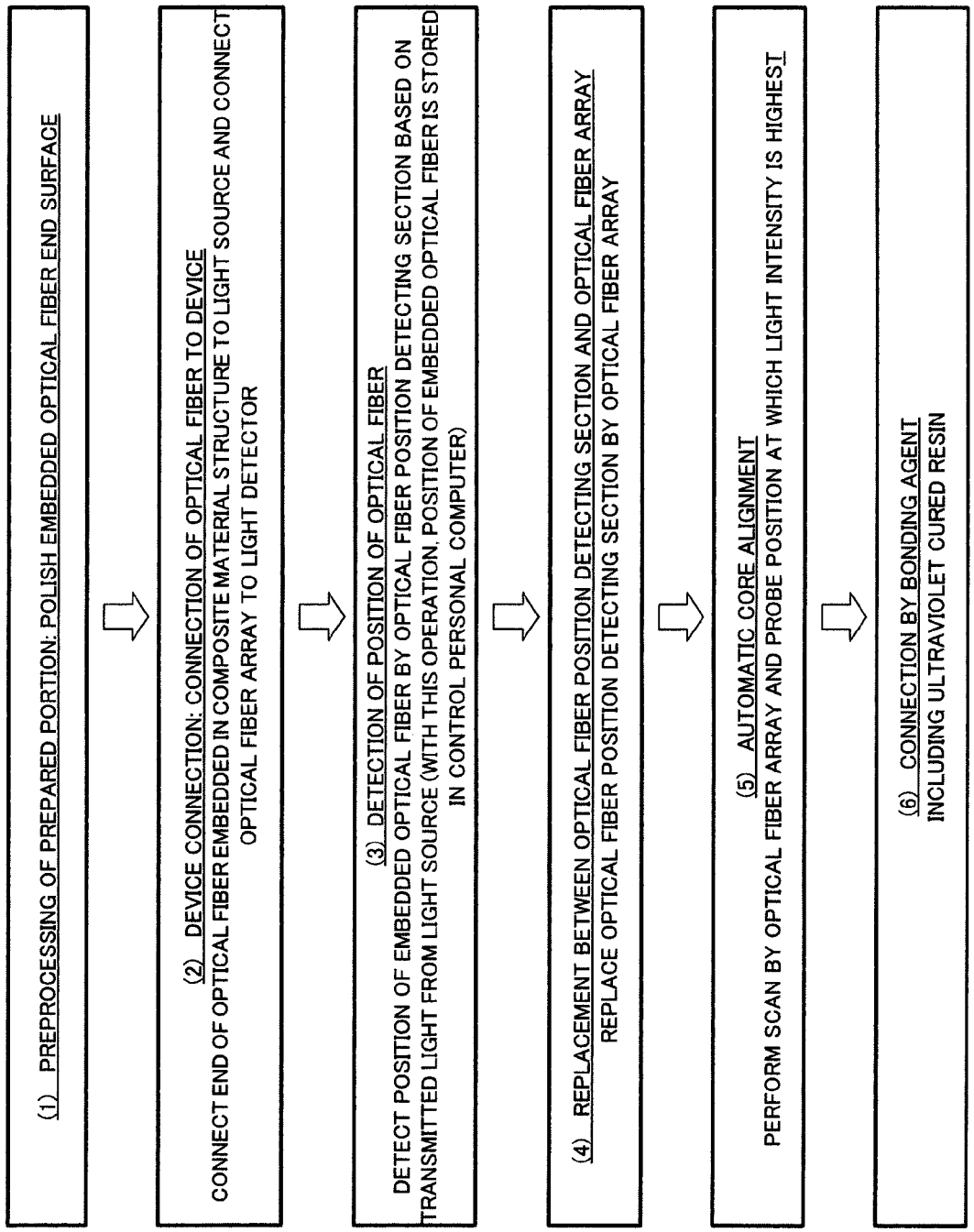
FIG. 7 is a block diagram showing a repairing procedure performed by the embedded optical fiber repairing device of FIG. 2.

Firstly, as shown in FIG. 6, the embedded optical fiber repairing device 30 includes an optical fiber position detecting section 34 for detecting the position of the embedded optical fiber 10 embedded in the cut portion of the composite material 2. The optical fiber position detecting section 34 is capable of detecting a core position of the embedded optical fiber 10 by light emitted from a light source 35 provided at the other end of the embedded optical fiber 10.

The optical fiber moving section 32 is provided at an upper portion thereof with the optical fiber array holding section 41 for holding the optical fiber array 21 provided at the end portion of the replacement optical fiber 20. The optical fiber moving section 32 is capable of adjusting the position of the optical fiber array 21 held, with 6 degrees of freedom. The 6 degrees of freedom is controlled by drivingly controlling the position of the optical fiber moving section 32, by using a stepping motor 33. Further, as adhesive for connecting the optical fiber array 21 to the embedded optical fiber 10 as will be described later, in the present embodiment, ultraviolet cured resin is used, and an ultraviolet ray radiation device 37 is provided to cure the ultraviolet cured resin.

The replacement optical fiber 20 provided at one end with the optical fiber array 21 is connected at the other end to a light detector 36 to detect the light emitted from the light source 35. In the present embodiment, the optical fiber array 21 is connected to the light detector 36 by means of an optical fiber 44 provided at one end with an adapter 43 connectable to the optical fiber array 21. The adapter 43 conforms in shape to the optical fiber array 21 and is capable of connecting the optical fiber 44. In this example, a general FC optical fiber connector 45 is provided at an intermediate portion of the optical fiber 44 connecting the adapter 43 to the light detector 36. In this way, a connecting work is made easier by simply connecting the optical fiber 44 by means of the connector.

The optical fiber array moving section 32, the optical fiber position detecting section 34 and the light detector 36 are connected to a control personal computer 38. Various signals such as position information and light detection information are stored in the control personal computer 38. The control personal computer 38 is configured to control the respective sections. The control personal computer 38 causes the optical fiber array moving section 32 to automatically align the core of the optical fiber array 21 with respect to the core of the embedded optical fiber 10.

In accordance with this configuration, in the embedded optical fiber repairing device 30, the optical fiber array 21 can be connected to the end surface of the embedded optical fiber 10 embedded in the composite material structure 1, in a state in which a light loss is least.

Next, connection of the replacement optical fiber 20 by the embedded optical fiber repairing device 30 will be described with reference to FIG. 7. Hereinafter, a description will be given of a procedure performed after the damaged portion of the embedded optical fiber 10 is cut together with the portion of the composite material 2. The portion of the composite material 2 is cut in such a manner that the opening portion (through-hole) 3 having a predetermined diameter is formed in the composite material structure 1. The size of the opening portion 3 is determined by a spacing of the embedded optical fiber 10, the size of the optical fiber moving section 32 of the repairing device, a movable range thereof, a damage range of the composite material structure 1, etc.

(1) [Preprocessing of Repaired Portion: Polish End Surface of Embedded Optical Fiber]

Firstly, the end surface of the embedded optical fiber 10 which faces the opening portion 3 formed in the composite material structure 1 is polished. This polishing is performed in such a manner that the end surface of the embedded optical fiber 10 and the cut surface of the composite material 2 are polished together.

(2) [Device Connection: Connection of Optical Fiber to Device]

Then, the optical fiber position detecting section 34 of the embedded optical fiber repairing device 30 is placed in the opening portion 3, and one end of the embedded optical fiber 10 embedded in the composite material 2 is connected to the light source 35. Also, the opposite end portion of the replacement optical fiber 20 provided with the optical fiber array 21 is connected to the light detector 36.

(3) [Detection of Position of Optical Fiber]

Then, the optical fiber position detecting section 34 of the embedded optical fiber repairing device 30 detects the core position of the embedded optical fiber 10 based on the transmitted light emitted from the light source 35. The optical fiber position detecting section 34 detects that the position at which the intensity of the light emitted from the light source 35 is highest is the core position of the embedded optical fiber 10. In this example, with this operation, the core position of the embedded optical fiber 10 is stored in the control personal computer 38 included in the embedded optical fiber repairing device 30.

(4) [Replacement Between Optical Fiber Position Detecting Section and Optical Fiber Array]

Then, at the core position of the embedded optical fiber 10 stored in the control personal computer 38, replacement between the optical fiber position detecting section 34 and the optical fiber array 21 is performed. This position adjustment is performed accurately by the position control by the optical fiber array moving section 32 having an automatic core alignment function. If the embedded optical fiber 10 is detected by the optical fiber position detecting section 34 from a location deviated from the core position rather than a location which is straight in front of the embedded optical fiber 10, replacement between the optical fiber position detecting section 34 and optical fiber array 21 may be omitted.

(5) [Automatic Core Alignment]

Next, the optical fiber array moving section 32 performs position control of the optical fiber array 21 to cause the optical fiber array 21 to perform scan, and the light detector 36 probes the position at which the intensity of the light emitted from the light source 35 is highest.

(6) [Connection by Adhesive]

Then, the embedded optical fiber repairing device 30 connects the optical fiber array 21 to the end surface of the embedded optical fiber 10 by means of the adhesive. As the adhesive, for example, ultraviolet cured resin is used, and the ultraviolet ray radiation device 37 radiates an ultraviolet ray to cure the ultraviolet cured resin. This allows the optical fiber array 21 of the optical fiber 20 to be connected to the end surface of the embedded optical fiber 10 to form a continuous optical fiber. Thus, the embedded optical fiber 10 is repaired. Although in the present example, the optical fiber array 21 is connected to the embedded optical fiber 10 by means of the ultraviolet cured resin, they may be connected together by means of another adhesive. As the ultraviolet cured resin or another adhesive, an ultraviolet cured resin or adhesive having a refractive index substantially equal to that of the optical fibers 10, 20 to be connected together is used.

Through the above steps, a work for connecting the optical fiber array 21 provided at one end of the replacement optical fiber 20 to the end surface 10a of the embedded optical fiber 10 at one side, is completed.

Then, the optical fiber array 21 provided et the other end of the replacement optical fiber 20 is connected to end surface 10a of the other embedded optical fiber 10. When the other end of the replacement optical fiber 20 is connected, the light source 35 is connected to the end of the other embedded optical fiber 10, and the light detector 36 is connected to the end of the embedded optical fiber 10 to which the light source 35 was connected when the replacement optical fiber 20 was connected to the embedded optical fiber 10 previously.

Then, the light detector 36 detects the light emitted from the light source 35. Automatic core alignment is performed assuming that the position at which the light intensity is highest is the core position of the embedded optical fiber 10. The optical fiber array 21 provided at the other end is connected to the end surface 10a of the embedded optical fiber 10 by means of the adhesive.

Through this step, a work for connecting the optical fiber arrays 21 provided at the both ends of the replacement optical fiber 20 to the both end surfaces 10a of the embedded optical fiber 10 exposed in the opening portion 3, is completed. Thus, a work for repairing the embedded optical fiber 10 is completed.

Figure 9:
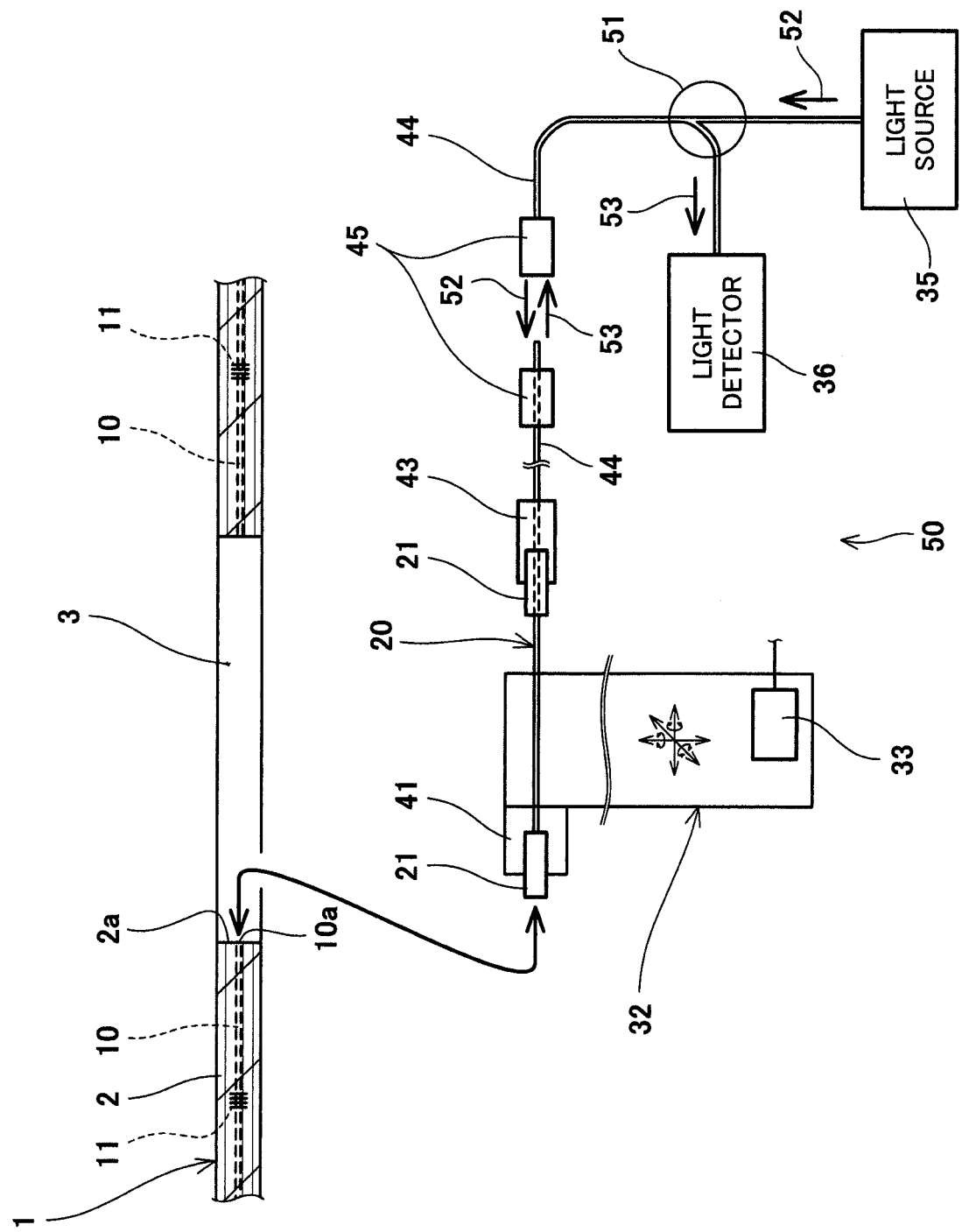
FIG. 9 is a cross-sectional view of a repaired portion of a composite material structure which is repaired by an embedded optical fiber repairing method of the composite material structure according to Embodiment 3 of the present invention.
Figure 10:
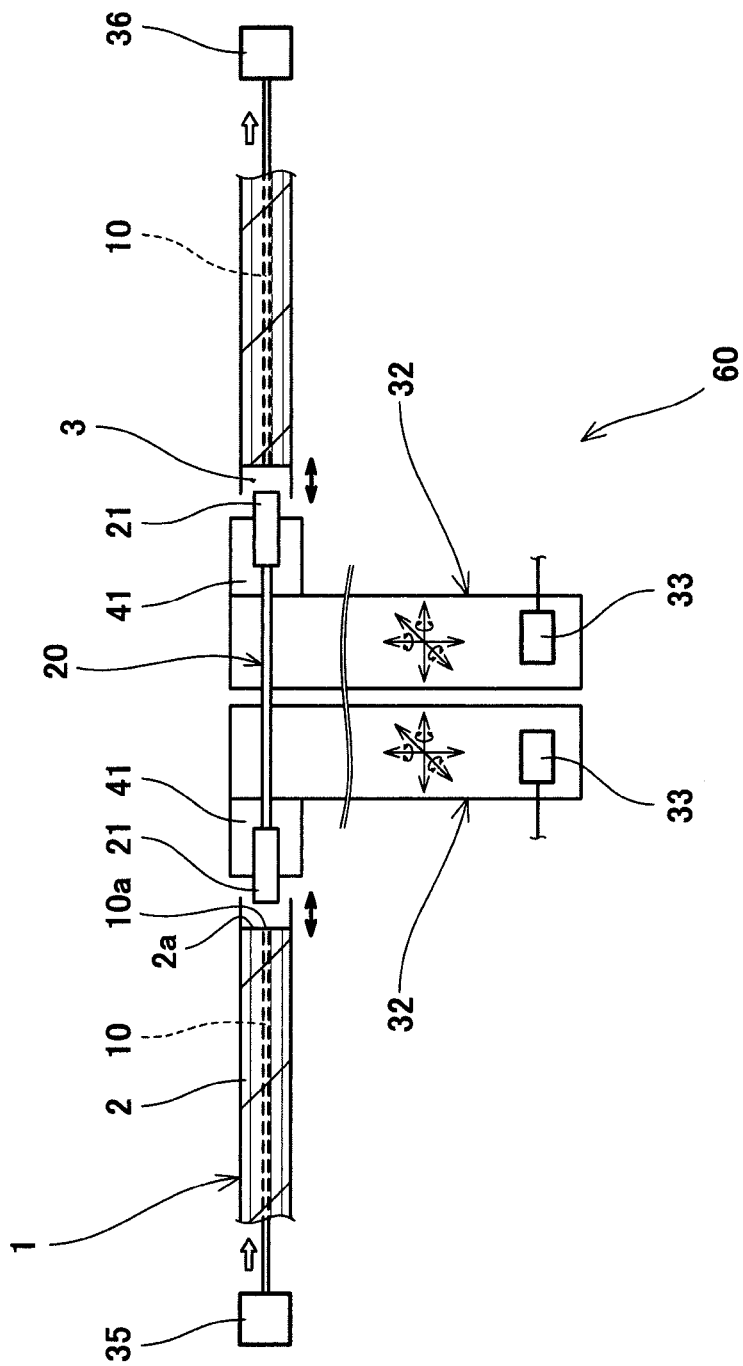
FIG. 10 is a cross-sectional view of a repaired portion of a composite material structure which is repaired by an embedded optical fiber repairing method of the composite material structure according to Embodiment 4 of the present invention.

Next, a description will be given of examples of configurations different from that of the embedded optical fiber repairing device 30, and procedures for connecting the replacement optical fiber 20 using the embedded optical fiber repairing devices, with reference to FIGS. 8 to 10. In the examples described below, the optical fiber arrays 21 are provided at the end portions of the replacement optical fiber 20 and the optical fiber array moving section 32 for moving the optical fiber arrays 21 is included in the device. As described above, the optical fiber array moving section 32 is configured to linearly move and rotate the optical fiber array 21 with 6 degrees of freedom (linear movement along X-axis, Y-axis and Z-axis and rotation around X-axis, Y-axis and Z-axis), to perform automatic core alignment. In these examples, the light detector 36 detects the light emitted from the light source 35, and the position at which the light intensity is highest is stored as the core position of the embedded optical fiber 10 in the control personal computer 38 (FIG. 6). The control personal computer 38 and the like will not be described in repetition.

Figure 8:
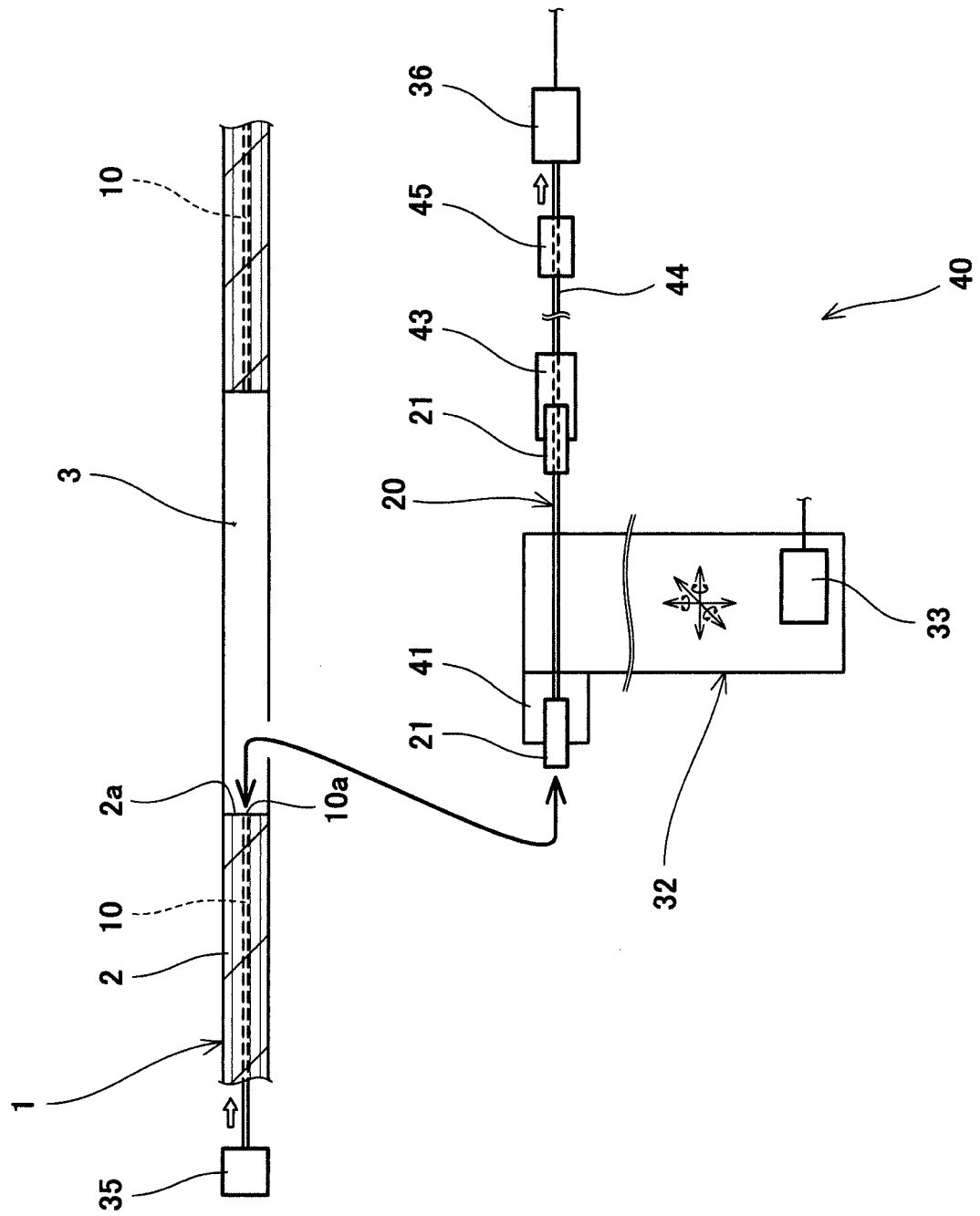
FIG. 8 is a cross-sectional view of a repaired portion of a composite material structure, which is repaired by an embedded optical fiber repairing method of the composite material structure according to Embodiment 2 of the present invention.

An embedded optical fiber repairing device 40 of Embodiment 2 of FIG. 8 is an embodiment in which the optical fiber array 21 is moved to the core position of the embedded optical fiber 10 and its core is automatically aligned with the core of the embedded optical fiber 10 without using the optical fiber position detecting section 34 of Embodiment 1. The same components as those in FIG. 6 are identified by the same reference symbols and will not be described.

In accordance with the embedded optical fiber repairing device 40, the end surface 10a of the embedded optical fiber 10 facing the opening portion 3 is polished, the optical fiber array 21 is moved to the end surface 10a of the embedded optical fiber 10, and the light detector 36 detects the light emitted from the light source 35. It is supposed that the position at which the light intensity is highest is the core position of the embedded optical fiber 10, and the control personal computer 38 can automatically align the core of the optical fiber array 21. Therefore, in accordance with the embedded optical fiber repairing device 40 of the present embodiment, alignment of the core of the optical fiber array 21 with respect to the core of the embedded optical fiber 10 can be performed quickly, and repair of the embedded optical fiber 10 can be performed quickly. In addition, the optical fiber array holding section 41 of the optical fiber array moving section 32 can be reduced in size, and can be easily put into the opening portion 3 provided in the repaired portion of the composite material structure 1.

The adapter 43 facilitates a connecting work of the replacement optical fiber 20 or the optical fiber 44 connected to the light detector 36, which makes it possible to quickly and efficiently repair the embedded optical fiber of the composite material structure 1.

Because of the above, the embedded optical fiber repairing device 40 of the present embodiment can quickly repair, for example, the fuselage and the like of the aircraft, and provide a repairing method with high reliability which can quickly repair the composite material structure 1 which is limited in repair time.

Next, Embodiment 3 of FIG. 9 will be described. In the present embodiment, the embedded optical fiber 10 has an FBG sensor 11, and the core alignment is performed by using a reflected light intensity of the FBG sensor 11. In the present embodiment, the same components as those in FIG. 6 are identified by the same reference symbols and will not be described.

In the present embodiment, also, the optical fiber array 21 is connected to the light detector 36 by means of the optical fiber 44 provided at one end with the adapter 43 conforming in shape to the optical fiber array 21 and connectable to the optical fiber array 21. The optical fiber 44 is connected by means of the general FC optical fiber connector 45. The optical fiber connector 45 of this example is configured to allow an incident light of the light source 35 and the reflected light of the FBG sensor 11 to pass therethrough.

The optical fiber 44 connected by means of the optical fiber connector 45 is connected to the light source 35 and to the light detector 36 via a circulator 51. The circulator 51 sends an incident light 52 from the light source 35 to the optical fiber array 21 via the optical fiber connector 45, and send reflected light 53 from the FBG sensor 11 to the light detector 36. In the present embodiment, also, connection of the optical fiber 44 is easily performed by using the optical fiber connector 45.

In accordance with the embedded optical fiber repairing device 50, the optical fiber array holding section 41 of the optical fiber array moving section 32 can be reduced in size, and can be easily put into the opening portion 3 provided in the repaired portion of the composite material structure 1.

In addition, the core alignment of the optical fiber array 21 is performed based on the reflected light intensity of the FBG sensor 11, and thus accurate connection of the optical fiber array 21 is attained. Furthermore, the adapter 43 and the optical fiber connector 45 facilitate a connecting work of the replacement optical fiber 20 or the optical fiber 44 connected to the light detector 36, which makes it possible to quickly and efficiently repair the embedded optical fiber of the composite material structure 1.

Because of the above, the present embodiment can quickly repair, for example, the fuselage and the like of the aircraft, and provide a repairing method with high reliability which can quickly repair the composite material structure 1 which is limited in repair time.

In Embodiment 3, the embedded optical fiber 10 has the FGB sensor 11. In the case of the embedded optical fiber 10 which does not include the FGB sensor 11, a light reflection device similar to the FGB sensor may be attached at an opposite side of the end surface 10a of the embedded optical fiber 10, in the opening portion 3. By doing so, the light refection device reflects the incident light 52 like the FGB sensor 11, the light detector 36 detects the intensity of the reflected light 53, the core alignment of the optical fiber array 21 is performed, and accurate connection of the optical fiber array 21 is performed.

Next, Embodiment 4 of FIG. 10 will be described. In the present embodiment, as shown in FIG. 8, an embedded optical fiber repairing device 60 includes two optical fiber array holding sections 41 for holding two optical fiber array 21 are disposed above two optical fiber array moving sections 32, respectively, and the optical fiber arrays 21 held by the optical fiber array holding sections 41 are oriented outwardly in opposite directions. The detailed configuration is identical to that of FIG. 8 and will not be illustrated and described.

In accordance with this example, the optical fiber array holding sections 41 hold the optical fiber arrays 21 provided at both ends of the replacement optical fiber 20, respectively, and the light detector 36 detects the light emitted from the light source 35 to connect the optical fiber array 21 of the replacement optical fiber 20 to the end surface 10a of the embedded optical fiber 10 of FIG. 8, and the core alignment of the optical fiber arrays 21 is performed, for each of both ends of the replacement optical fiber 20. This makes it possible to automatically align the cores of the two optical fiber arrays 21 provided at both ends of the replacement optical fiber 20 to the cores of the embedded optical fiber 10 almost at the same time.

In the case of the embedded optical fiber repairing device 60, it is preferable that the optical fiber array holding sections 41 of the optical fiber array moving sections 32 are reduced in size so that they are easily put into the opening portion 3 provided in the repaired portion of the composite material structure 1.

By the work similar to that of FIG. 8, it becomes possible to connect the optical fiber arrays 21 provided at both ends of the replacement optical fiber 20 to the two portions of the embedded optical fiber 10 facing the opening portion 3, almost at the same time. Thus, the embedded optical fiber of the composite material structure 1 can be repaired quickly and efficiently.

Because of the above, the present embodiment can quickly repair, for example, the fuselage and the like of the aircraft, and provide a repairing method with high reliability which can quickly repair the composite material structure 1 which is limited in repair time.

Figure 11:
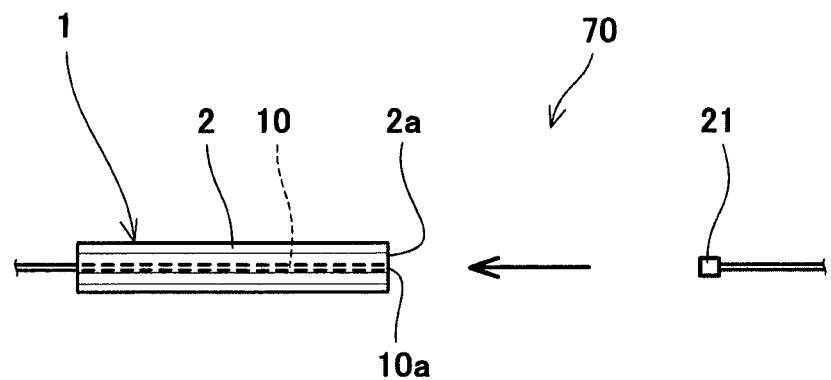
FIG. 11 is a side view schematically showing a connecting structure of the embedded optical fiber according to Embodiment 1 of the present invention.
Figure 12:
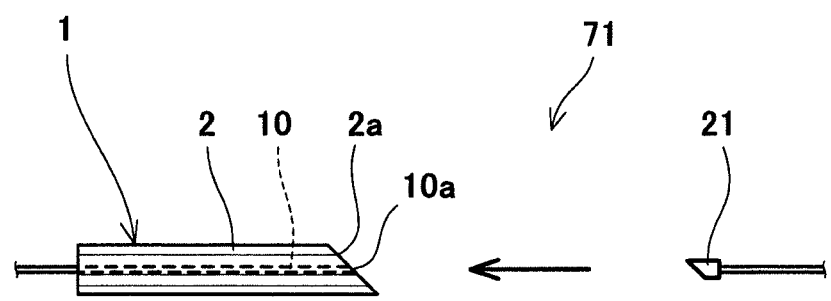
FIG. 12 is a side view schematically showing a connecting structure of the embedded optical fiber according to Embodiment 2 of the present invention.
Figure 14:
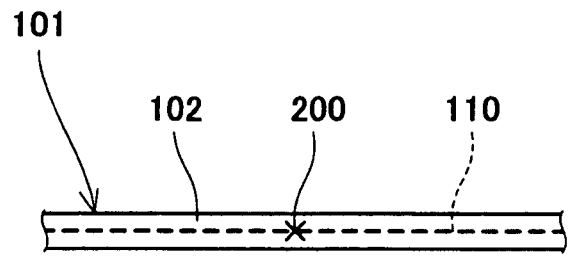
FIG. 14A is a cross-sectional view showing a state in which an optical fiber embedded in a conventional composite material is damaged.
FIG. 14B is a cross-sectional view showing a repairing method in a case where an optical fiber embedded in a conventional composite material is damaged.
FIG. 14C is a cross-sectional view showing a repairing method that follows the method of FIG. 14B.
Figure 14:
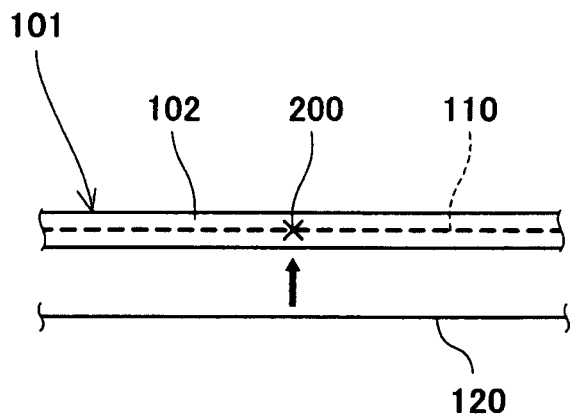
Figure 14:
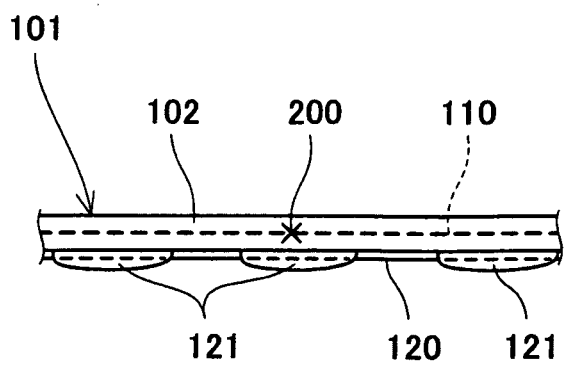

As shown in FIGS. 11 and 12, in a connecting structure for connecting the embedded optical fiber 10 embedded in the composite material structure 1 to the optical fiber arrays 21, an end surface angle may be 90 degrees or may be inclined (e.g., 45 degrees). The end surface of the optical fiber array 21 may be decided according to conditions of the repaired portion, the core diameter of the optical fiber, the cladding diameter of the optical fiber, etc.

A connecting structure 70 of FIG. 11 is an example in which the end surface angle of the composite material structure 1 provided with the embedded optical fiber 10 is 90 degrees. In this case, the end surface angle of the optical fiber array 21 connected to the embedded optical fiber 10 is also 90 degrees.

A connecting structure 71 of FIG. 12 is an example in which the end surface angle of the composite material structure 1 provided with the embedded optical fiber 10 is 45 degrees. In this case, the end surface angle of the optical fiber array 21 connected to the embedded optical fiber 10 is also 45 degrees.

The embedded optical fiber 10 of the composite material structure 1 and the optical fiber array 21 which are connected together by means of the above stated connecting structure are aligned with respect to each other such that cores of the optical fibers conform to each other, and bonded together by means of ultraviolet cured resin.

Example 1

Test results of the connecting portions of the optical fibers connected by the above stated connecting structures 70, 71 will be described hereinafter. In this test, the optical fiber array 21 provided at the end portion of the optical fiber to be connected is connected to the embedded optical fiber 10 exposed at the end surface of the composite material structure 1 embedded with the embedded optical fiber 10, and the intensity of the transmitted light is measured after the connecting. A test environment is such that a room temperature and a normal humidity.

The composite material structure 1 used in the test is made of a carbon fiber reinforced epoxy resin composite material cured at 180 degrees C. The embedded optical fiber 10 embedded in the composite material structure 1 is a polyimide coating small-diameter optical fiber (single mode), and has a core diameter of 8.5 μm, a cladding diameter of 40 μm, and a coating diameter of 48 μm.

A test was conducted for each of a case of connecting the embedded optical fiber 10 of the composite material structure 1 to the optical fiber array 21 with the end surface angle of 90 degrees and a case of connecting the embedded optical fiber 10 of the composite material structure 1 to the optical fiber array 21 with the end surface angle of 45 degrees.

When the optical fiber array 21 is connected to the end surface of the embedded optical fiber 10, the core of the embedded optical fiber 10 and the core of the optical fiber array 21 are aligned with each other by using an automatic core alignment device. After the core alignment is completed, the embedded optical fiber 10 of the composite material structure 1 and the optical fiber array 21 are fastened together by means of the ultraviolet cured resin.

Then, the light intensity of each connecting portion of the embedded optical fiber 10 connected as described above was measured. In measurement of the light intensity, a single-mode optical fiber cord (attached with FC connector at one end; communication single mode quartz optical fiber) is fusion-bonded to an exposed portion of the small-diameter embedded optical fiber 10 embedded in the composite material structure 1, by a fusion-splicing connecting device. The light source is connected to the optical fiber cord connector side, while the light detector is connected to the optical fiber array side, to measure the intensity of the light transmitted through the optical fiber cord, the small-diameter optical fiber, and the optical fiber array. The measurement was made in such a manner that a center wavelength of the light source was 1550 nm, and a wavelength range of the light detector was 0.75 to 1.7 μm.

FIG. 13 is a table list showing results of measurement of light intensity in the test in the above example. Evaluation of the results of the test are as follows.

In evaluation of the results of test, comparison was made for the light intensities after the core alignment and connection, with respect to the light intensities of the light source. The light loss was 6.8 dB in the case of the end surface angle of 90 degrees and 8.1 dB in the case of the end surface angle of 45 degrees. As can be seen from the results, it may be determined that the light loss generated by connecting the optical fiber array 21 to the embedded optical fiber 10 is a level at which the optical fiber can be operated as the optical fiber sensor in a damage detection system provided in the composite material structure 1. It may be presumed that each value of the light loss contains a light loss in a portion other than the connecting portion at which the optical fiber array 21 is connected to the embedded optical fiber 10, and therefore a value of the light loss generated only in the connecting portion at which the optical fiber array 21 is connected to the embedded optical fiber 10 is much smaller than the each value.

Since it is necessary to connect the embedded optical fiber 10 embedded in the composite material structure 1 to a measurement instrument provided outside, it is necessary to take out the embedded optical fiber 10 from a peripheral portion of the composite material structure 1, or to provide the connector connected to the embedded optical fiber 10 in the peripheral portion of the composite material structure 1. However, it is required that the peripheral portion of the composite material structure 1 be trimmed in manufacture to allow the composite material structure 1 to have a predetermine dimension. Therefore, it is difficult to take out the embedded optical fiber 10 from the peripheral portion of the composite material structure 1, or to provide the connector in the peripheral portion of the composite material structure 1. As a solution to this, Japanese Laid-Open Patent Application Publication No. 2003-315601 discloses a manufacturing method of a structure. However, in accordance with the above stated connecting structures 70, 71, even when the peripheral portion of the composite material structure 1 is trimmed in manufacture of the composite material structure 1 embedded with the embedded optical fiber 10, the optical fiber array 21 can be connected to the embedded optical fiber 10 by polishing the end surface of the embedded optical fiber 10 together with the end surface of the composite material structure 1 after the trimming. Therefore, the connecting structures 70, 71 can be configured without a need for the use of a special connector to connect the embedded optical fiber 10 to the measurement instrument provided outside.

Although in the above embodiments, the composite material structure 1 of the aircraft has been exemplarily described, the damaged portion of the optical fiber 10 in composite material structures having other structures can be repaired. The present invention is in no way limited to the above embodiments.

The above embodiments are merely exemplary and can be changed in various ways without departing from the spirit of the present invention. The present invention is in no way limited to the above embodiments.

The embedded optical fiber repairing method of the present invention is utilized in composite material structures for which damage caused by an impact, or the like, are detected by using embedded optical fibers, like the aircraft.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A method of repairing an embedded optical fiber of a composite material structure including an embedded optical fiber embedded in a composite material, comprising:
   removing a portion of the composite material including a damaged portion of the embedded optical fiber to form an opening portion;
   polishing an end surface of the embedded optical fiber exposed in the opening portion and an end surface of the composite material exposed in the opening portion such that the end surface of the embedded optical fiber and the end surface of the composite material are polished together to be coplanar with each other; and
   performing position adjustment such that a core of the polished embedded optical fiber and a core of a replacement optical fiber are aligned with each other, butting the end surface of the embedded optical fiber and an end surface of the replacement optical fiber with each other, and connecting the end surface of the embedded optical fiber and the end surface of the replacement optical fiber together.

2. The method of repairing the embedded optical fiber of the composite material structure, according to claim 1, wherein the replacement optical fiber has an optical fiber array at an end portion thereof, and an end surface of the optical fiber array and the end surface of the embedded optical fiber are connected together by bonding.

3. The method of repairing the embedded optical fiber of the composite material structure, according to claim 1, comprising:
   after polishing the end surface of the embedded optical fiber and the end surface of the composite material, emitting a light from a light source into the embedded optical fiber, the light source being provided at an end portion of the embedded optical fiber which is at an opposite side of the damaged portion;
   detecting the light of the light source at the end surface of the embedded optical fiber exposed in the opening portion; and
   determining that a position at which an intensity of the light is highest is a position of the core of the embedded optical fiber, aligning the core of the replacement optical fiber with the core of the embedded optical fiber and connecting the end surface of the embedded optical fiber and the end surface of the replacement optical fiber together.

4. The method of repairing the embedded optical fiber of the composite material structure, according to claim 1, wherein the embedded optical fiber includes a light reflection device; the method comprising:
   after polishing the end surface of the embedded optical fiber and the end surface of the composite material, applying an incident light through the polished end surface of the embedded optical fiber; and
   detecting the light reflected by the light reflection device, determining that a position at which an intensity of the light is highest is a position of the core of the embedded optical fiber, aligning the core of the replacement optical fiber with the core of the embedded optical fiber, and connecting the end surface of the embedded optical fiber and the end surface of the replacement optical fiber together.

5. The method of repairing the embedded optical fiber of the composite material structure, according to claim 1, comprising:
   holding the replacement optical fiber connected to the embedded optical fiber on the composite material structure by one of surfaces of the composite material structure and closing the opening portion by the other surface of the composite material structure.

6. The method of repairing the embedded optical fiber of the composite material structure, according to claim 1, comprising:
   bonding and stacking composite material thin plates together in the opening portion, and embedding the replacement optical fiber connected to the embedded optical fiber between the composite material thin plates to close the opening portion.

7. A repairing structure of an embedded optical fiber of a composite material structure, which is repaired by the embedded optical fiber repairing method as recited in any one of claim 1, in which the replacement optical fiber connected to the end surface of the damaged portion of the embedded optical fiber is held by a replacement optical fiber holding member provided on one of surfaces of the composite material structure, and a reinforcement member for closing the opening portion is provided on the other surface of the composite material structure provided with the replacement optical fiber holding member.

8. A connecting structure of an embedded optical fiber for connecting an optical fiber array to an embedded optical fiber embedded in a composite material structure,
   wherein the embedded optical fiber has a polished surface in a portion corresponding to an end surface of the composite material structure; and
   the optical fiber array is connected to the end surface of the embedded optical fiber by bonding in a state in which position adjustment is performed in such a manner that a core of the embedded optical fiber and a core of an optical fiber provided with the optical fiber array are aligned with each other at the polished surface of the embedded optical fiber.

9. The connecting structure of the embedded optical fiber according to claim 8,
   wherein a light is emitted from a light source into the embedded optical fiber, the light source being provided at an end portion of the embedded optical fiber which is at an opposite side of the polished surface,
   the light of the light source is detected at the end surface of the embedded optical fiber exposed in the polished surface;
   a position at which all intensity of the light is highest is determined as a position of the core of the embedded optical fiber;

the core of the optical fiber array is aligned with the core of the embedded optical fiber, and the embedded optical fiber and the optical fiber array are connected together.

* * * * *